United States Patent
Huang et al.

(10) Patent No.: US 10,943,281 B2
(45) Date of Patent: Mar. 9, 2021

(54) INFORMATION SEARCH METHOD, INFORMATION SEARCH DEVICE AND INFORMATION SEARCH NON-TRANSITORY COMPUTER STORAGE MEDIUM

(71) Applicant: BAIDU ONLINE NETWORK TECHNOLOGY (BEIJING) CO., LTD., Beijing (CN)

(72) Inventors: Jizhou Huang, Beijing (CN); Shaolei Ding, Beijing (CN); Lu Wan, Beijing (CN); He Qu, Beijing (CN); Zhi Jin, Beijing (CN); Lei Lv, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 318 days.

(21) Appl. No.: 15/316,289

(22) PCT Filed: Jul. 13, 2015

(86) PCT No.: PCT/CN2015/083899
§ 371 (c)(1),
(2) Date: Dec. 5, 2016

(87) PCT Pub. No.: WO2016/155142
PCT Pub. Date: Oct. 6, 2016

(65) Prior Publication Data
US 2017/0200213 A1    Jul. 13, 2017

(30) Foreign Application Priority Data
Mar. 30, 2015  (CN) .......................... 201510145665.6

(51) Int. Cl.
*G06Q 30/00* (2012.01)
*G06Q 30/06* (2012.01)
(Continued)

(52) U.S. Cl.
CPC ....... *G06Q 30/0625* (2013.01); *B29C 64/386* (2017.08); *B33Y 50/00* (2014.12);
(Continued)

(58) Field of Classification Search
CPC ........................................ G06Q 30/0601–0645
(Continued)

(56) References Cited

U.S. PATENT DOCUMENTS

| | | | | |
|---|---|---|---|---|
| 7,373,246 B2 * | 5/2008 | O'Clair | ............... | G06F 16/9537 701/532 |
| 8,412,588 B1 | 4/2013 | Bodell et al. | | |

(Continued)

FOREIGN PATENT DOCUMENTS

| | | |
|---|---|---|
| CN | 101339575 | 1/2009 |
| CN | 102063475 A | 5/2011 |

(Continued)

OTHER PUBLICATIONS

Algorithm is 'search engine' for virtual 3-D objects. (2005). Laser Focus World, 41(6), 9(1). Retrieved from https://dialog.proquest.com/professional/docview/673800641?accountid=161862 (Year: 2005).*

(Continued)

*Primary Examiner* — Resha Desai
*Assistant Examiner* — Ashley D Preston
(74) *Attorney, Agent, or Firm* — Hodgson Russ LLP

(57) ABSTRACT

A computer-implemented method for searching information and an electronic device are disclosed. The method includes: receiving, at one or more computing devices, a search term; acquiring, at the one or more computing devices, a 3D search result corresponding to the search term if the search term includes a 3D search requirement, in which the 3D search result includes a 3D picture and one or more service items corresponding to the 3D picture; displaying, at the one
(Continued)

or more computing devices, the 3D search result; determining, at the one or more computing devices, a service item selected by a user; and processing, at the one or more computing devices, the 3D picture according to the service item. The method can provide a service on the basis of the 3D search result when the user has the 3D search requirement, thereby better satisfying the user' requirement and improving the user experience.

14 Claims, 8 Drawing Sheets

(51) Int. Cl.
*G06F 16/51* (2019.01)
*G06F 16/532* (2019.01)
*G06F 16/9535* (2019.01)
*B29C 64/386* (2017.01)
*G06F 16/00* (2019.01)
*G06F 16/951* (2019.01)
*B33Y 50/00* (2015.01)
*B33Y 99/00* (2015.01)

(52) U.S. Cl.
CPC .............. *B33Y 99/00* (2014.12); *G06F 16/00* (2019.01); *G06F 16/51* (2019.01); *G06F 16/532* (2019.01); *G06F 16/951* (2019.01); *G06F 16/9535* (2019.01); *G06Q 30/0633* (2013.01); *G06Q 30/0643* (2013.01)

(58) Field of Classification Search
USPC ................................................. 705/26.1–27.2
See application file for complete search history.

(56) References Cited

U.S. PATENT DOCUMENTS

| 9,916,345 | B1* | 3/2018 | Makadia | ................ | G06F 16/58 |
| 2007/0077001 | A1 | 4/2007 | Hayashi | | |
| 2008/0055334 | A1 | 3/2008 | Matsuoka et al. | | |
| 2014/0067609 | A1* | 3/2014 | Heger | ................ | G06Q 30/0623 705/26.61 |
| 2015/0051999 | A1* | 2/2015 | Apsley | ................ | G06Q 30/0621 705/26.5 |
| 2015/0169636 | A1* | 6/2015 | Ovsjanikovs | ....... | G06F 16/5838 707/722 |
| 2016/0171591 | A1* | 6/2016 | Williams | ........... | G06O 30/0635 705/26.81 |

FOREIGN PATENT DOCUMENTS

| CN | 102279898 | | 12/2011 |
| CN | 104203547 | A | 12/2014 |
| CN | 104731936 | | 6/2015 |
| CN | 104750816 | A | 7/2015 |
| JP | 2008305334 | | 12/2008 |
| JP | 2010510587 | | 4/2010 |
| JP | 2011180793 | | 9/2011 |
| JP | 2015507250 | | 3/2015 |
| WO | 0077681 | | 12/2000 |
| WO | 2014071248 | | 5/2014 |

OTHER PUBLICATIONS

European Patent Office, Extended European Search Report for EP15887109.5, dated Sep. 21, 2017.
Banks, Web Services Resource Framework (WSRF)—Primer: Committee Draft 01, Oasis, Dec. 7, 2005, pp. 1-42.
JPO, Office Action for JP Application No. 2017503821, dated May 24, 2018.
ISA/CN, International Search Report for PCT/CN2015/083899 dated Dec. 25, 2015.
JPO, Office Action for JP Application No. 2017503821, dated Jan. 24, 2018.

* cited by examiner

INFORMATION SEARCH METHOD, INFORMATION SEARCH DEVICE AND INFORMATION SEARCH NON-TRANSITORY COMPUTER STORAGE MEDIUM

CROSS-REFERENCE TO RELATED APPLICATIONS

This application is a U.S. national phase of International Application No. PCT/CN2015/083899, which claims priority to Chinese Patent Application Serial No. 201510145665.6, titled with "method and device for searching information" and filed with the State Intellectual Property Office of P. R. China on Mar. 30, 2015 by Baidu Online Network Technology (Beijing) Co., Ltd., the entire content of which is incorporated herein by reference.

FIELD

The present disclosure relates to the field of Internet technology, and more particularly to a method and a device for searching information.

BACKGROUND

A user may search information via a search engine. Sometimes, the user may input a search term including a three dimensional (3D) picture browsing requirement when searching information. The search term may be, for example, an interior trim, a model, a 3D xxx and the like.

In the related art, for this kind of search terms, it also uses a common searching manner and a common displaying way, thus the search results are spontaneous results displayed one by one. Further, it is unable to provide a service based on a 3D search result, thereby not satisfying requirements of users well.

SUMMARY

The method for searching information provided according to embodiments the present disclosure includes: receiving a search term; acquiring a 3D search result corresponding to the search term if the search term includes a 3D search requirement, in which the 3D search result includes a 3D picture and one or more service items corresponding to the 3D picture; displaying the 3D search result; and determining a service item selected by a user and processing the 3D picture according to the service item.

Embodiments of the present disclosure further provide an electronic device. The electronic device includes: one or more processors; a memory; one or more programs, stored in the memory and configured to perform following operations if the one or more programs are executed by the one or more processors: receiving a search term; acquiring a 3D search result corresponding to the search term if the search term includes a 3D search requirement, in which the 3D search result includes a 3D picture and one or more service items corresponding to the 3D picture; displaying the 3D search result; and determining a service item selected by a user and processing the 3D picture according to the service item.

Embodiments of the present disclosure further provide a non-transitory computer storage medium. The non-transitory computer storage medium has one or more modules stored therein and is configured to perform following operations if the one or more modules are executed: receiving a search term; acquiring a 3D search result corresponding to the search term if the search term includes a 3D search requirement, in which the 3D search result includes a 3D picture and one or more service items corresponding to the 3D picture; displaying the 3D search result; and determining a service item selected by a user and processing the 3D picture according to the service item.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the drawings, in which.

DETAILED DESCRIPTION

Figure 1:
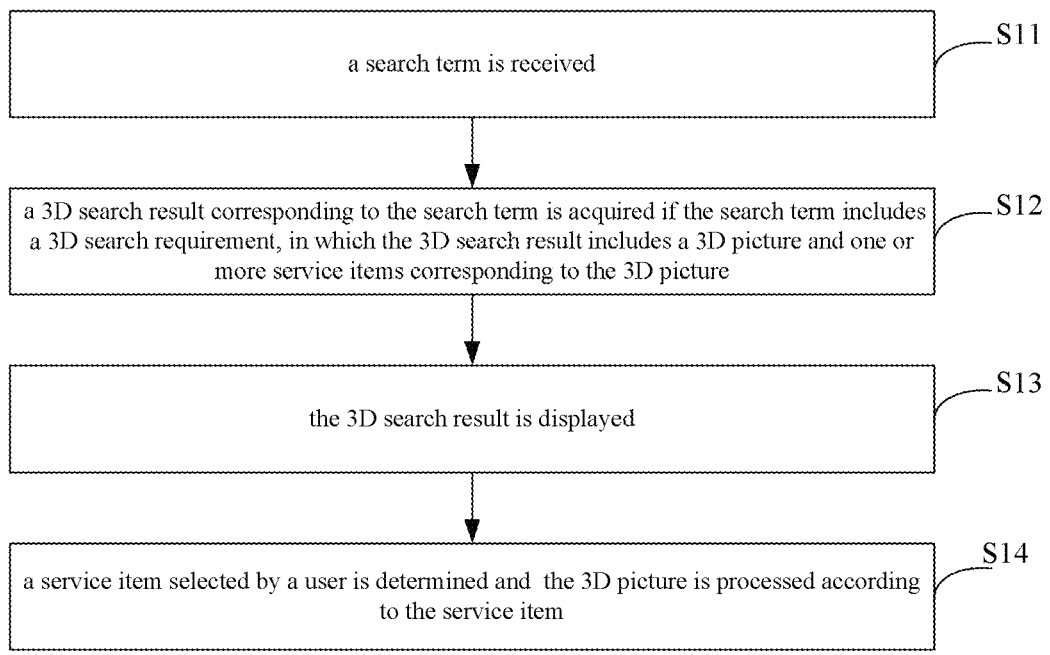
FIG. 1 is a flow chart showing a method for searching information according to an embodiment of the present disclosure.

Embodiments of the present disclosure will be described in detail and examples of the embodiments are shown in the drawings. The same or similar elements and the elements having same or similar functions are denoted by like reference numerals throughout the descriptions. The embodiments described herein with reference to drawings are explanatory, used to explain the present disclosure, and not understood to limit the present disclosure. Instead, the embodiments of the present disclosure comprise all the variants, modifications and their equivalents within the spirit and scope of the present disclosure as defined by the claims.

FIG. 1 is a flow chart showing a method for searching information according to an embodiment of the present disclosure. The method includes followings.

At S11, a search term is received.

A search engine may receive the search term input by the user to a search bar, in which the search term may be input in text form or in speech form.

The search term may include a 3D search requirement. Specifically, it is judged whether the search term includes the 3D search requirement in accordance with a specific term included in the search term or by performing a semantic analysis on the search term.

For example, it is determined that the search term includes the 3D search requirement if the search term includes a term "3D"; or, it is determined that such a term includes the 3D search requirement by performing the semantic analysis if the term is interior trim, models or the like.

At S12, a 3D search result corresponding to the search term is acquired if the search term includes the 3D search requirement, in which the 3D search result includes a 3D picture and one or more service items corresponding to the 3D picture.

Alternatively, acquiring the 3D search result corresponding to the search term includes:

generating the 3D search result in real time according to the search term; or acquiring the 3D search result from a pre-established 3D model library.

Specifically, one or more 3D pictures related to the search term may be acquired in real time if generating the 3D search result in real time and then the one or more 3D pictures may be arranged according to a predetermined rule.

Or, a serve may pre-establish the 3D model library according to a historical search of the user. The 3D model library may include the one or more 3D pictures corresponding to different search terms. When searching, the one or more 3D pictures corresponding to the search term may be acquired from the 3D model library.

Alternatively, the service item includes at least one of printing and purchasing. Certainly, it may be understood that, the service item includes others.

At S13, the 3D search result is displayed.

Figure 2:
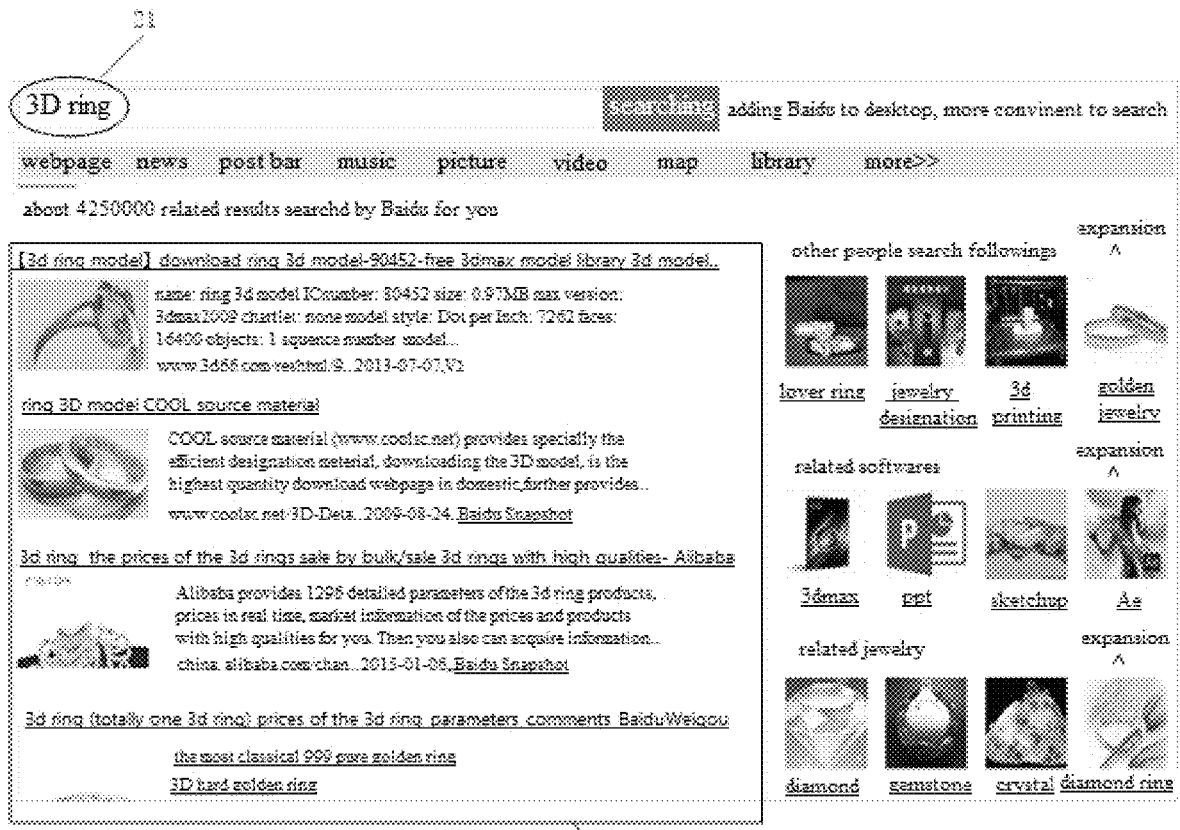
FIG. 2 is a schematic diagram displaying a search result in the prior art.

The search result is displayed on a search result webpage. In the prior art, referring to FIG. 2, the search result 22 is independent information displayed one by one rather than structured information if the search term 21 includes the 3D search requirement.

Figure 3A:
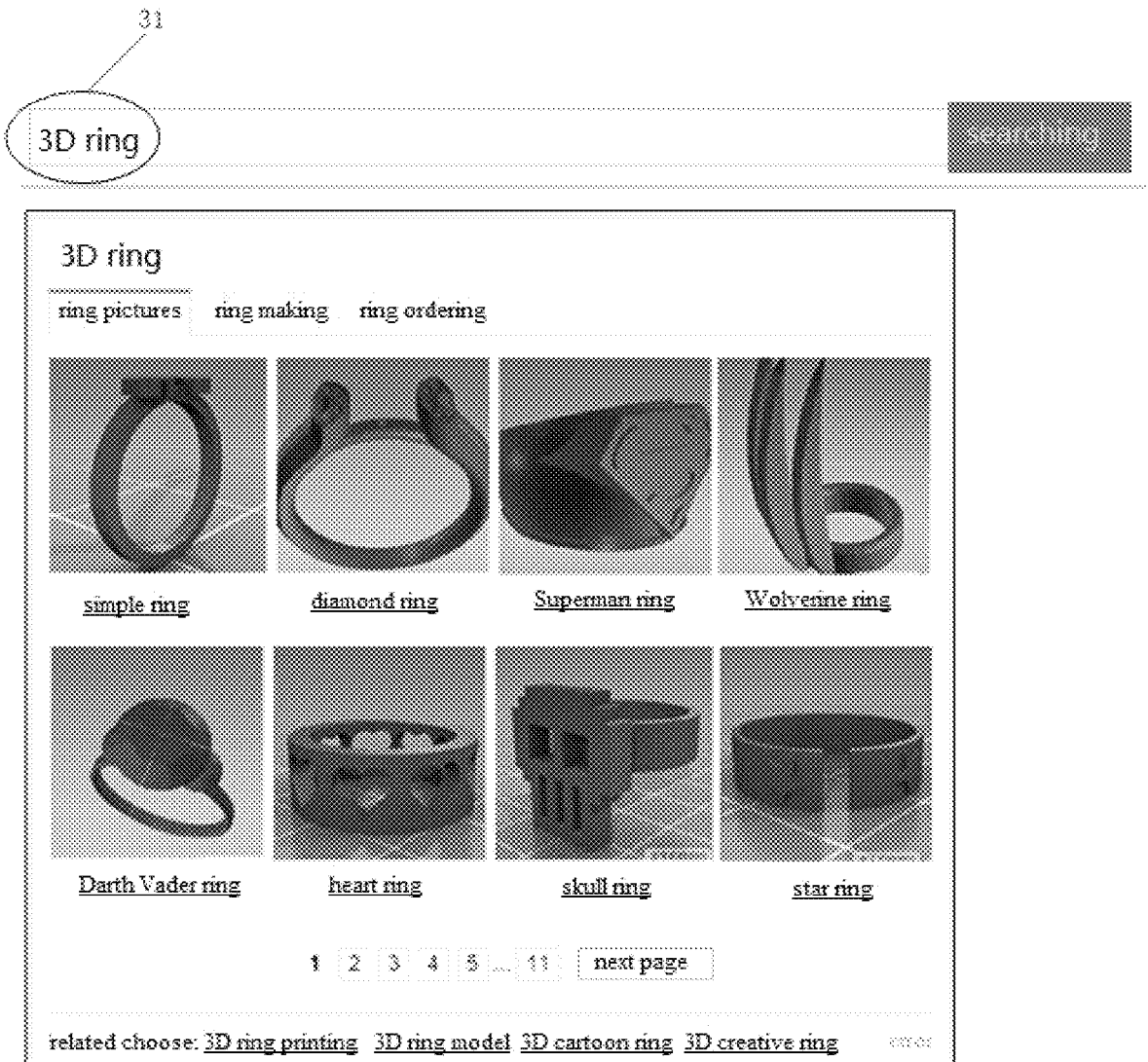
FIG. 3a is a schematic diagram displaying a search result in embodiments of the present disclosure.

In the embodiment, referring to FIG. 3a, the 3D search result 32 can be displayed as structured information if the search term 31 includes the 3D search requirement.

Furthermore, as shown in FIG. 3a, the 3D picture in the embodiment may concretely refer to a 3D model picture.

At S14, a service item selected by a user is determined and the 3D picture is processed according to the service item.

For example, the user may select a merchant to purchase a product corresponding to the 3D picture in the merchant if selecting purchasing. Or, the user may print a 3D model corresponding to the 3D picture if selecting printing.

Figure 4:
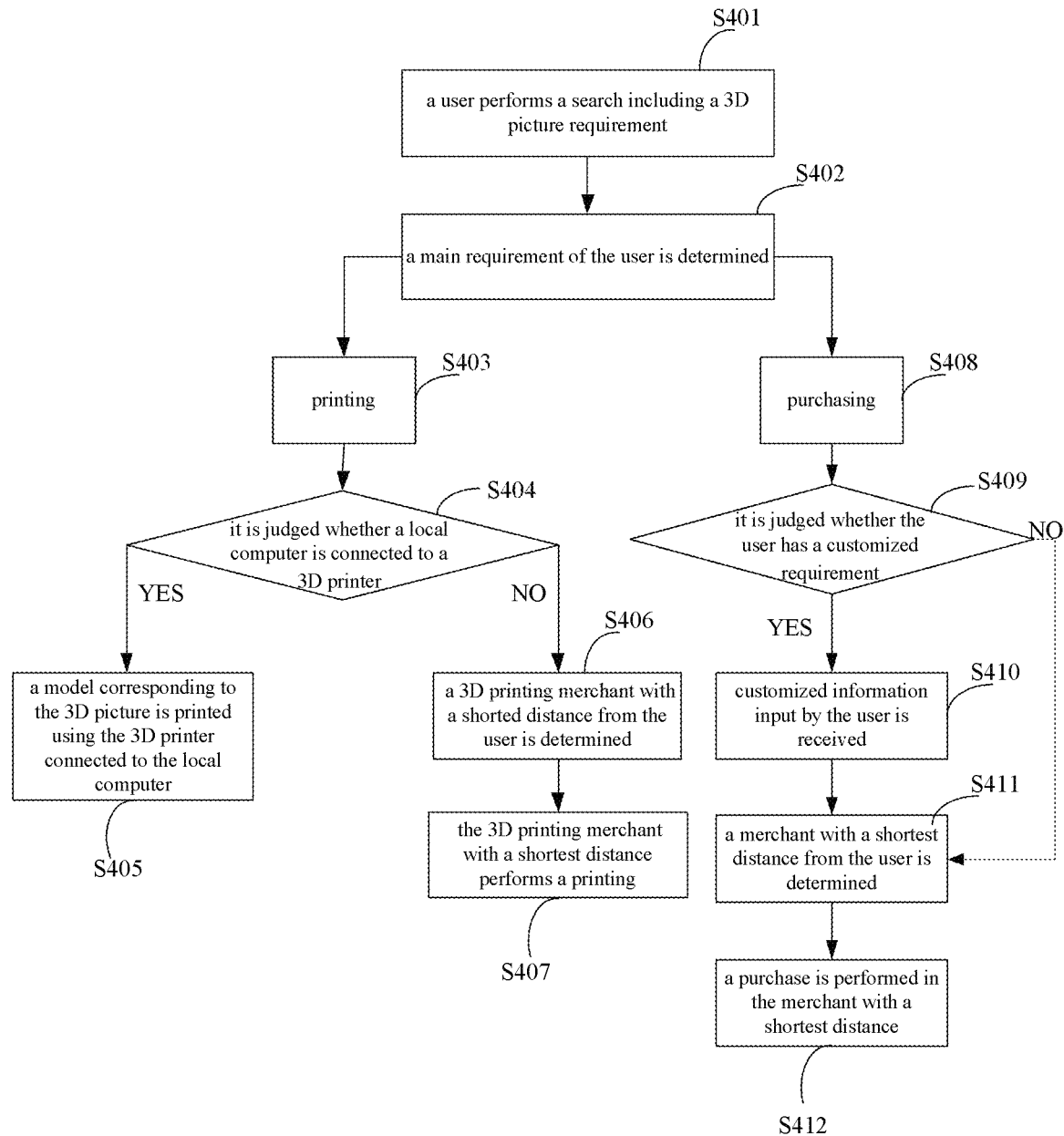
FIG. 4 is a flow chart showing a method for searching information according to another embodiment of the present disclosure.

In another embodiment, referring to FIG. 4, the method for searching information includes followings.

At S401, a user performs a search including a 3D picture requirement.

For example, it is judged whether the search includes the 3D picture requirement by analyzing a search term input by the user.

At S402, a main requirement of the user is determined.

The main requirement may be, for example, browsing, printing, purchasing or the like. The embodiment takes the printing and the purchasing as examples.

At S403, the main requirement is determined to be the printing.

Figure 5:
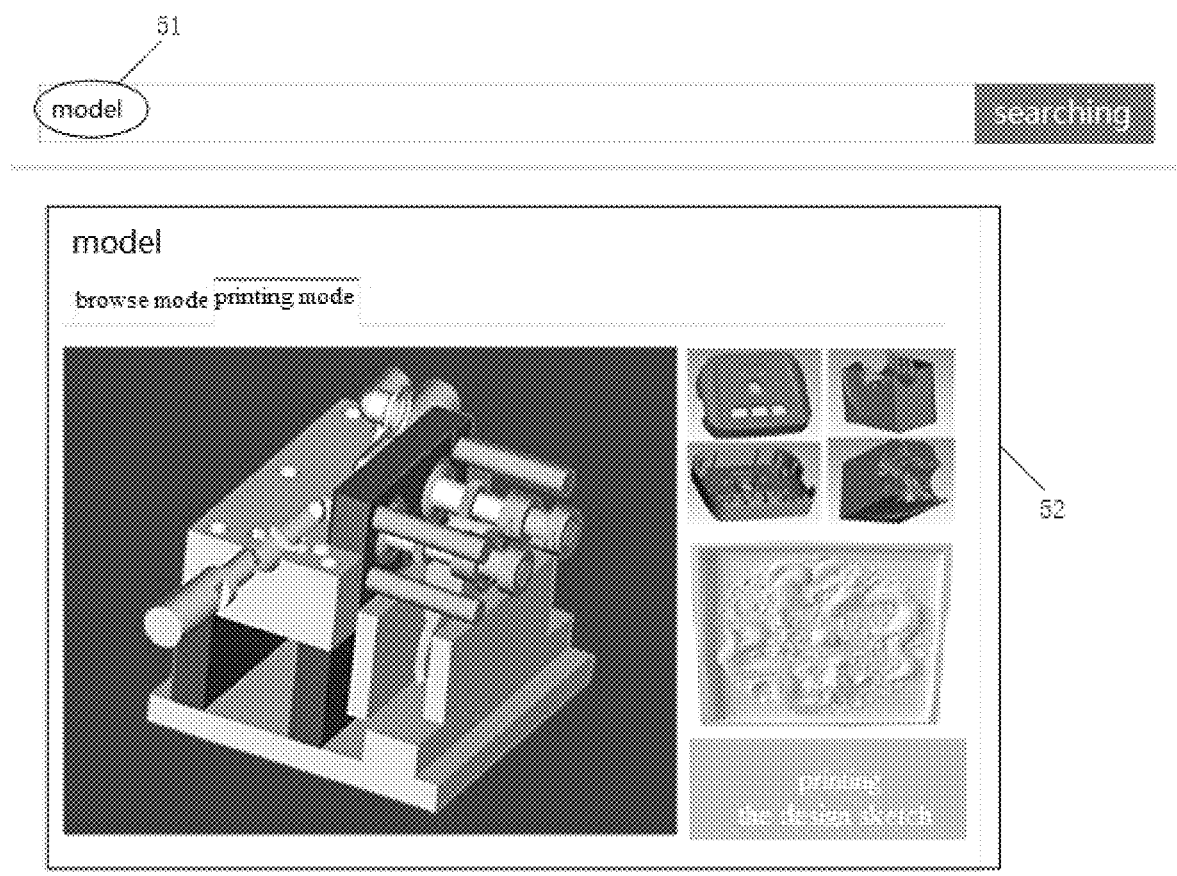
FIG. 5 is a schematic diagram displaying another search result in embodiments of the present disclosure.
Figure 5:
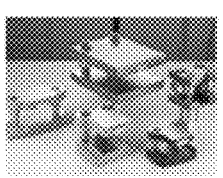

For example, referring to FIG. 5, a service item may be included in a search result after acquiring a 3D search result 52 according to a search term 51 "model". For example, the service item includes a browsing mode and a printing mode.

The main requirement may be determined to be the printing after the user clicks the printing mode.

At S404, it is judged whether a local computer is connected to a 3D printer. S405 is performed if the local computer is connected to the 3D printer. Otherwise, S406 is performed.

For example, device information connected currently to the local computer may be detected, and then it is judged whether the local computer is connected to the 3D printer according to the device information detected.

At S405, a model corresponding to the 3D picture is printed using the 3D printer connected to the local computer.

For example, referring to FIG. 5, a 3D model shown as FIG. 5 is printed after the user clicks printing.

At S406, a 3D printing merchant with a shorted distance from the user is determined if the local computer is disconnected from the 3D printer. The local computer is connected to a 3D printing manufacturer suitable for the user by default if the local computer is disconnected from the 3D printer. For example, the 3D printing manufacturer with a shortest distance from the user.

The 3D printing manufacturer with a shortest distance is taken as an example as default in the embodiment. The 3D printing manufacturer may be selected by the user according to displayed information.

At S407, the 3D printing merchant with a shortest distance performs the printing.

For example, the 3D picture is provided to the merchant in an online ordering way, and then the merchant posts a 3D model printed back to the user.

It may be understood that, the user may customize personalized information before printing, and then the printing is performed.

Furthermore, a traditional printing method may be used when performing the 3D printing, a model is created layer by layer, or a new 3D printing technique may be used, for example, a model grows from a resin pool using light and oxygen. The 3D printing method is not limited in the embodiment.

At S408, the main requirement is determined to be the purchasing.

For example, referring to FIG. 3a, the main requirement is determined to be the purchasing if the user clicks ring purchasing.

At S409, it is judged whether the user has a customized requirement. S410 is performed if the user has the customized requirement. Otherwise, S411 is performed.

For example, it is indicated that the user has the customized requirement if the user clicks ring making shown in FIG. 3a. Otherwise, the user has no customized requirement.

At S410, customized information input by the user is received.

A customized information interface may be displayed to the user such that the user may input the customized information to the customized information interface.

Figure 3B:
FIG. 3b is another schematic diagram displaying a search result in embodiments of the present disclosure.

For example, an interface shown as FIG. 3b is displayed after the user clicks the ring making such that the user may input the customized information 33 to the interface.

At S411, a merchant with a shortest distance from the user is determined.

Figure 3C:
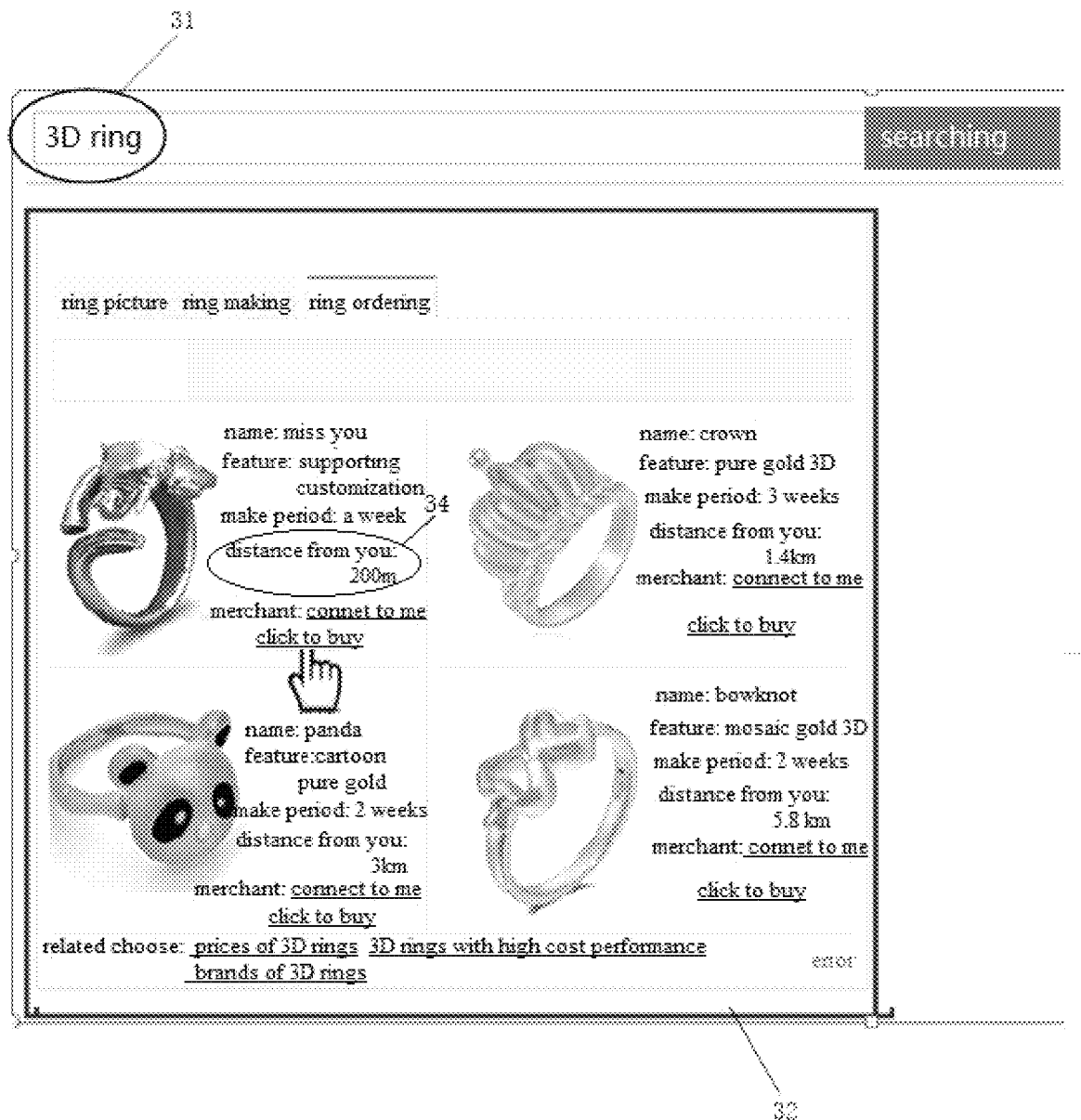
FIG. 3c is another schematic diagram displaying a search result in embodiments of the present disclosure.

For example, the search result shown as FIG. 3c is displayed after the user clicks ring ordering, in which the search result includes a distance 34 between the merchant and the user. The user may select the merchant with a shortest distance according to the distance.

Certainly, it may be understood that, other merchant information may be displayed, and the user may select another merchant according to the other merchant information.

At S412, a purchase is performed in the merchant with a shortest distance.

For example, the user may perform the purchase by ordering online.

Alternatively, a directly ordering interface is displayed if performing a purchase to simplify a purchase procedure.

Figure 3D:
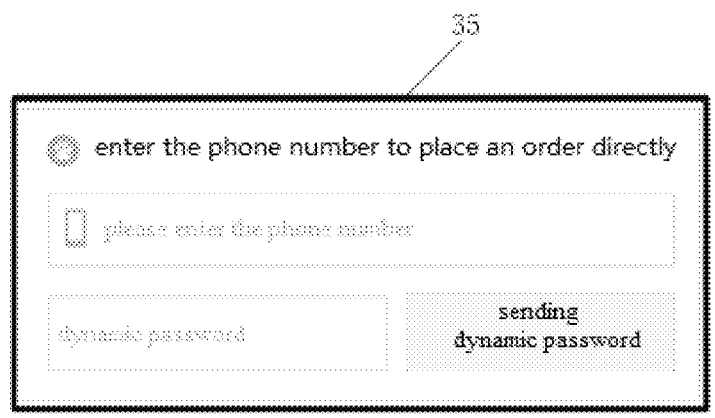
FIG. 3d is another schematic diagram displaying a search result in embodiments of the present disclosure.

For example, the directly ordering interface 35 shown as FIG. 3*d* is displayed after the user selects the merchant and clicks "click to buy". Then, the user may input a phone number directly to perform a purchase without a procedure of registering, logining and the like, thus it is convenient to purchase.

In the embodiment, by acquiring the 3D search result corresponding to the search term, displaying the 3D search result if the user has the 3D search requirement, and processing the 3D picture according to the service item, the service based on the 3D picture requirement may be provided, thereby satisfying a user's requirement better and improving user experience. By displaying the 3D search result as structured information, it may improve a display effect. By including a model item of operating the 3D search result in the search result webpage, it may directly purchase or print the 3D model, thereby realizing search experience that it is available as far as it is visible.

Figure 6:
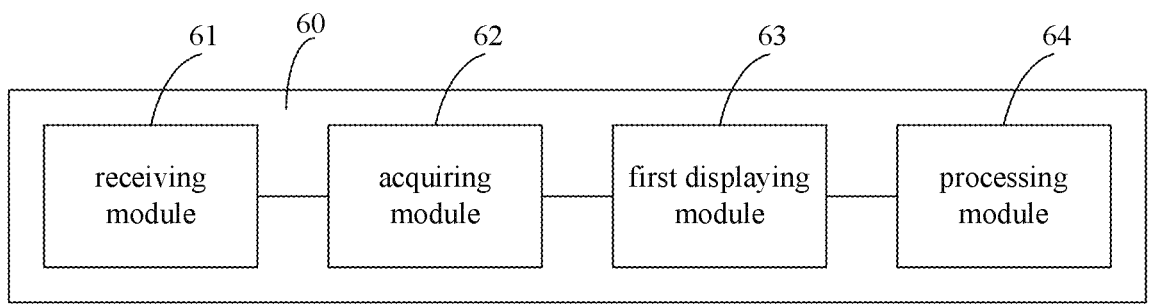
FIG. 6 is a schematic diagram illustrating a device for searching information according to another embodiment of the present disclosure.

FIG. 6 is a schematic diagram illustrating a device for searching information according to another embodiment of the present disclosure. The device is disposed in a search engine. The device 60 includes: a receiving module 61, an acquiring module 62, a first displaying module 63 and a processing module 64.

The receiving module 61 is configured to receive a search term.

A search engine may receive the search term input by the user to a search bar, in which the search term may be input in text form or in speech form.

The search term may include a 3D search requirement. Specifically, it is judged whether the search term includes the 3D search requirement in accordance with a specific term included in the search term or by performing a semantic analysis on the search term.

For example, it is determined that the search term includes the 3D search requirement if the search term includes a term "3D"; or, it is determined that such a term includes the 3D search requirement by performing the semantic analysis if the term is interior trim, models or the like.

The acquiring module 62 is configured to acquire a 3D search result corresponding to the search term if the search term includes the 3D search requirement, in which the 3D search result includes a 3D picture and one or more service items corresponding to the 3D picture.

Alternatively, acquiring the 3D search result corresponding to the search term includes:

generating the 3D search result in real time according to the search term; or acquiring the 3D search result from a pre-established 3D model library.

Specifically, one or more 3D pictures related to the search term may be acquired in real time if generating the 3D search result in real time and then the one or more 3D pictures may be arranged according to a predetermined rule.

Or, a serve may pre-establish the 3D model library according to a historical search of the user. The 3D model library may include the one or more 3D pictures corresponding to different search terms. When searching, the one or more 3D pictures corresponding to the search term may be acquired from the 3D model library.

Alternatively, the service item includes at least one of printing and purchasing. Certainly, it may be understood that, the service item includes others.

The first displaying module 63 is configured to display the 3D search result.

The search result is displayed on a search result webpage. In the prior art, referring to FIG. 2, the search result 22 is independent information displayed one by one rather than structured information if the search term 21 includes the 3D search requirement.

In the embodiment, referring to FIG. 3*a*, the 3D search result 32 can be displayed as structured information if the search term 31 includes the 3D search requirement.

Furthermore, as shown in FIG. 3*a*, the 3D picture in the embodiment may concretely refer to a 3D model picture.

The processing module 64 is configured to determine a service item selected by a user and process the 3D picture according to the service item.

For example, the user may select a merchant to purchase a product corresponding to the 3D picture in the merchant if selecting purchasing. Or, the user may print a 3D model corresponding to the 3D picture if selecting printing.

Figure 7:
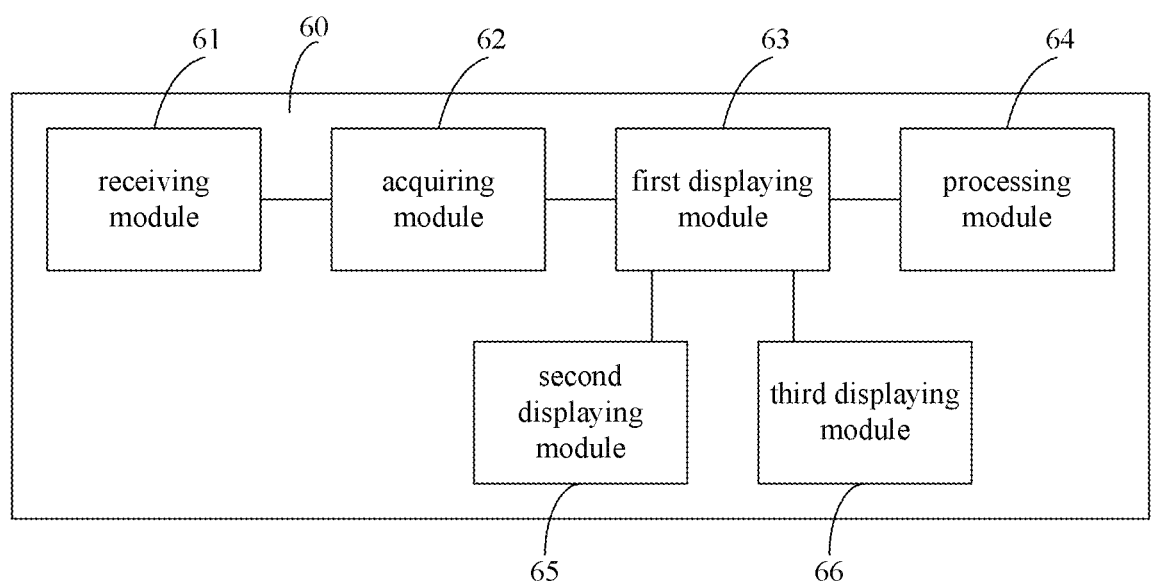
FIG. 7 is a schematic diagram illustrating a device for searching information according to another embodiment of the present disclosure.

In another embodiment, referring to FIG. 7, the device 60 further includes: a second displaying module 65.

The second displaying module 65 is configured to display a customized information interface after the user selects the service item so as to process the 3D picture according to customized information input by the user to the customized information interface.

For example, an interface shown as FIG. 3*b* is displayed after the user clicks ring making such that the user inputs the customized information 33 to the interface.

Alternatively, the processing module 64 is specifically configured to:

acquire distances between the merchants providing the service item and the user and select the merchant with a shortest distance; or acquire information of the merchants providing the service item, display the information to the user and determine the merchant selected by the user according to the information displayed.

For example, the search result shown as FIG. 3*c* is displayed after the user clicks ring ordering, in which the search result includes a distance 34 between the merchant and the user. The user may select the merchant with a shortest distance according to distance.

Certainly, it may be understood that, other merchant information may be displayed, and the user may select another merchant according to the other merchant information.

Alternatively, if the selected service item is printing, the processing module is configured to:

judge whether a local computer is connected to a 3D printer;

print a model corresponding to the 3D picture using the 3D printer connected if the local computer is connected to the 3D printer; and connect a suitable printing manufacturer for the user by default to provide a printing and posting service if the local computer is disconnected from the 3D printer.

For example, referring to FIG. 5, a 3D model shown as FIG. 5 is printed after the user clicks printing.

Alternatively, if the service item is purchasing, the device 60 further includes: a third displaying module 66.

The third displaying module 66 is configured to display an ordering interface to the user.

For example, the directly ordering interface 35 shown as FIG. 3d is displayed after the user selects the merchant and clicks "click to buy". Then, the user may input a phone number directly to perform a purchase without a procedure of registering, logining and the like, thus it is convenient to purchase.

In the embodiment, by acquiring the 3D search result corresponding to the search term, displaying the 3D search result if the user has the 3D search requirement, and processing the 3D picture according to the service item, the service based on the 3D picture requirement may be provided, thereby satisfying a user's requirement better and improving user experience. By displaying the 3D search result as structured information, it may improve a display effect. By including a model item of operating the 3D search result in the search result webpage, it may directly purchase or print the 3D model, thereby realizing search experience that it is available as far as it is visible.

Embodiments of the present disclosure further provide an electronic device. The electronic device includes: one or more processors; a memory; one or more programs, stored in the memory and configured to perform following operations if the one or more programs are executed by the one or more processors: receiving a search term; acquiring a 3D search result corresponding to the search term if the search term comprises a 3D search requirement, wherein the 3D search result comprises a 3D picture and one or more service items corresponding to the 3D picture; displaying the 3D search result; and determining a service item selected by a user and processing the 3D picture according to the service item.

Embodiments of the present disclosure further provide a non-transitory computer storage medium. The non-transitory computer storage medium has one or more modules stored therein and is configured to perform following operations if the one or more modules are executed: receiving a search term; acquiring a 3D search result corresponding to the search term if the search term comprises a 3D search requirement, wherein the 3D search result comprises a 3D picture and one or more service items corresponding to the 3D picture; displaying the 3D search result; and determining a service item selected by a user and processing the 3D picture according to the service item.

It is to be illustrated that, terms such as "first" and "second" are used herein for purposes of description and are not intended to indicate or imply relative importance or significance. In addition, in the description of the present disclosure, "a plurality of" means two or more than two, unless specified otherwise.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions, which should be understood by those skilled in the art.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

Reference throughout this specification to "an embodiment," "some embodiments," "example," "a specific example," or "some examples," means that a particular feature, structure, material, or characteristic described in connection with the embodiment or example is included in at least one embodiment or example of the present disclosure. In the specification, the terms mentioned above are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments are exemplary and cannot be construed to limit the present disclosure, and changes, alternatives, and modifications can be made in the embodiments by those skilled in the art without departing from scope of the present disclosure.

What is claimed is:

1. A computer-implemented method for searching information, comprising:
   receiving, by one or more computing devices, a search term input into an internet search engine, wherein the internet search engine acquires internet webpage search results corresponding to the search term and recommendations based on the internet webpage search results;
   determining, by the one or more computing devices, that the search term comprises a 3D search requirement according to a specific term comprised in the search term or by performing a semantic analysis on the search term;
   acquiring, by the one or more computing devices, a 3D search result corresponding to the search term in response to the determination that the search term comprises the 3D search requirement, wherein the 3D search result comprises a 3D picture and one or more service items corresponding to the 3D picture;

displaying, by the one or more computing devices, the 3D search result, internet webpage search results, and recommendations based on webpage search results;

determining, by the one or more computing devices, a service item selected by a user; and processing, by the one or more computing devices, the 3D picture according to the service item;

wherein processing the 3D picture includes selecting, by the one or more computing devices, a merchant from merchants providing the service item so as to process the 3D picture in the merchant, and includes one or more of the following: transmitting a print request of the 3D picture for printing and transmitting the 3D picture to a merchant for printing;

wherein selecting, by the one or more computing devices, a merchant from merchants providing the service item comprises:

acquiring, by the one or more computing devices, distances between the merchants providing the service item and the user, and acquiring information of the merchants providing the service item;

displaying to a user one or more of the following: the merchant with a shortest distance and information of the merchants providing the service item;

wherein when the search term does not comprise a 3D search requirement, the method comprises: displaying, by the one or more computing devices, the internet webpage search results and the recommendations based on the internet webpage search results, and not displaying 3D search results in response to processing the 3D picture, printing, by the one or more computing devices, a 3D model of the 3D picture.

2. The method according to claim 1, wherein the one or more service items comprises at least one of printing and purchasing.

3. The method according to claim 2, wherein if the service item is printing, processing, by the one or more computing devices, the 3D picture according to the service item comprises:

judging, by the one or more computing devices, whether a local computer is connected to a 3D printer; and printing, by the one or more computing devices, a model corresponding to the 3D picture using the 3D printer if the local computer is connected to the 3D printer.

4. The method according to claim 3, further comprising connecting, by the one or more computing devices, a suitable printing manufacturer for the user by default to provide a printing and posting service if the local computer is disconnected from the 3D printer.

5. The method according to claim 1, further comprising:

displaying, at the one or more computing devices, a customized information interface after the user selects the service item so as to process the 3D picture according to customized information input by the user to the customized information interface.

6. The method according to claim 2, wherein if the service item is purchasing, the method further comprises: displaying, by the one or more computing devices, an ordering interface to the user.

7. An electronic device, comprising:
one or more processors;
a memory; and
one or more programs, stored in the memory and configured to perform following operations if the one or more programs are executed by the one or more processors:

receiving a search term input into an internet search engine, wherein the internet search engine acquires internet webpage search results corresponding to the search term and recommendations based on the internet webpage search results;

determining, by the one or more computing devices, that the search term comprises a 3D search requirement according to a specific term comprised in the search term or by performing a semantic analysis on the search term;

acquiring a 3D search result corresponding to the search term in response to the determination that the search term comprises the 3D search requirement, wherein the 3D search result comprises a 3D picture and one or more service items corresponding to the 3D picture;

displaying the 3D search result, internet webpage search results, and recommendations based on webpage search results;

determining a service item selected by a user; and processing the 3D picture according to the service item;

wherein processing the 3D picture includes selecting, by the one or more computing devices, a merchant from merchants providing the service item so as to process the 3D picture in the merchant, and includes one or more of the following: transmitting a print request of the 3D picture for printing and transmitting the 3D picture to a merchant for printing;

wherein selecting, by the one or more computing devices, a merchant from merchants providing the service item comprises:

acquiring, by the one or more computing devices, distances between the merchants providing the service item and the user, and acquiring information of the merchants providing the service item;

displaying to a user one or more of the following: the merchant with a shortest distance and information of the merchants providing the service item;

when the search term does not comprise a 3D search requirement, the method comprises: displaying, at the one or more computing devices, the internet webpage search results and the recommendations based on the internet webpage search results, and not displaying 3D search results in response to processing the 3D picture, printing, by the one or more computing devices, a 3D model of the 3D picture.

8. A non-transitory computer storage medium, having one or more modules stored therein and configured to perform following operations if the one or more modules are executed:

receiving a search term input into an internet search engine, wherein the internet search engine acquires internet webpage search results corresponding to the search term and recommendations based on the internet webpage search results;

determining, by the one or more computing devices, that the search term comprises a 3D search requirement according to a specific term comprised in the search term or by performing a semantic analysis on the search term;

acquiring a 3D search result corresponding to the search term in response to the determination that the search term comprises the 3D search requirement, wherein the 3D search result comprises a 3D picture and one or more service items corresponding to the 3D picture;

displaying the 3D search result, internet webpage search results, and recommendations based on webpage search results;

determining a service item selected by a user; and processing the 3D picture according to the service item;

wherein processing the 3D picture includes selecting, by the one or more computing devices, a merchant from merchants providing the service item so as to process the 3D picture in the merchant, and includes one or more of the following: transmitting a print request of the 3D picture for printing and transmitting the 3D picture to a merchant for printing;

wherein the one or more programs are further configured to perform following operations if the one or more programs are executed by the one or more processors:

displaying a customized information interface after the user selects the service item so as to process the 3D picture according to customized information input by the user to the customized information interface;

wherein if the service item is printing, processing the 3D picture according to the service item comprises:

judging whether a local computer is connected to a 3D printer;

printing a model corresponding to the 3D picture using the 3D printer if the local computer is connected to the 3D printer; and connecting a suitable printing manufacturer for the user by default to provide a printing and posting service if the local computer is disconnected from the 3D printer;

wherein when the search term does not comprise a 3D search requirement, the method comprises: displaying, by the one or more computing devices, the internet webpage search results and the recommendations based on the internet webpage search results, and not displaying 3D search results;

wherein selecting, by the one or more computing devices, a merchant from merchants providing the service item comprises:

acquiring, by the one or more computing devices, distances between the merchants providing the service item and the user, and acquiring information of the merchants providing the service item;

displaying to a user one or more of the following: the merchant with a shortest distance and information of the merchants providing the service item in response to processing the 3D picture, printing, by the one or more computing devices, a 3D model of the 3D picture.

9. The electronic device according to claim 8, wherein if the service item is purchasing, the method further comprises:

displaying an ordering interface to the user.

10. The non-transitory computer storage medium according to claim 8, wherein the one or more modules are further configured to perform following operations if the one or more modules are executed:

displaying a customized information interface after the user selects the service item so as to process the 3D picture according to customized information input by the user to the customized information interface.

11. The non-transitory computer storage medium according to claim 10, wherein if the service item is printing, processing the 3D picture according to the service item comprises:

judging whether a local computer is connected to a 3D printer;

printing a model corresponding to the 3D picture using the 3D printer if the local computer is connected to the 3D printer; and connecting a suitable printing manufacturer for the user by default to provide a printing and posting service if the local computer is disconnected from the 3D printer.

12. The non-transitory computer storage medium according to claim 10, wherein if the service item is purchasing, the method further comprises:

displaying an ordering interface to the user.

13. The non-transitory computer storage medium according to claim 8, wherein processing the 3D picture according to the service item comprises:

selecting a merchant from merchants providing the service item so as to process the 3D picture in the merchant.

14. The non-transitory computer storage medium according to claim 13, wherein selecting a merchant from merchants providing the service item comprises:

acquiring distances between the merchants providing the service item and the user, and selecting the merchant with a shortest distance; or acquiring information of the merchants providing the service item, displaying the information to the user and determining the merchant selected by the user according to the information displayed.

* * * * *